Oct. 27, 1964 R. K. RICHARDS 3,154,764

DECIMAL COUNTER CIRCUITS

Filed Sept. 3, 1957 3 Sheets-Sheet 1

INVENTOR.
Richard K. Richards
BY
Norman C. Fulmer
Att'y.

Oct. 27, 1964 R. K. RICHARDS 3,154,764

DECIMAL COUNTER CIRCUITS

Filed Sept. 3, 1957 3 Sheets-Sheet 2

INVENTOR.

Richard K. Richards

BY

Norman C. Fulmer

Att'y.

INVENTOR.
Richard K. Richards
BY
Norman C. Fulmer
Att'y.

United States Patent Office 3,154,764
Patented Oct. 27, 1964

3,154,764

DECIMAL COUNTER CIRCUITS

Richard K. Richards, Old Troy Road, Wappingers Falls, N.Y.

Filed Sept. 3, 1957, Ser. No. 681,776
10 Claims. (Cl. 340—174)

This invention relates to counter circuits as used in digital computers, business machines, item counters and the like. More particularly, it relates to decimal counters employing magnetic cores although the principles of the invention can be applied to counters operating with a radix other than ten and can be applied to counters using other types of components such as tubes or transistors.

Many types of counter circuits are known to the prior art. They may be classified into two categories. The counters in one category are known as ring counters and are formed by shift register circuits wherein only one of the stages is "on" at any one time and wherein the output from the last stage in the register is fed back to the first stage to form a closed "ring." For a decimal counter, ten stages are included in the ring. A major disadvantage of counters of this type is that the ten stages require an objectionably large number of components. In the other category of counters, the stages are comprised of complementing binary storage devices wherein a pulse will cause the stage of a device to change to its opposite value (1 or 0) regardless of its initial value. With counters of this type only four stages are necessary for a decimal counter. However, these counters have some undesirable features in that the four stages inherently count to sixteen instead of ten, and it is therefore necessary to add costly complications to create the desired decimal action. Particularly in the case of counters employing magnetic cores, it has not been found possible to make a complementing device with a single core, so that when the extra equipment which is needed to incorporate the complementing feature is added to the extra equipment needed to make a ten-counter out of a basically sixteen-counter circuit, the total number of cores required is usually even greater than the ten required for a ring counter.

The major object of this invention is to provide a counter circuit which requires fewer components than counters known to the prior art.

Another object is to provide a counter which is reliable and inexpensive.

Another object is to provide a decimal counter circuit which employs fewer than ten magnetic cores.

The circuits of the invention employ the ring counter principle, but are different from conventional ring counters in that the binary signal (1 or 0) fed back from the last stage of the ring to the first stage is not the signal as obtained directly from the last stage but is some logical function of this signal in combination with signals obtained at other stages in the ring. In the simplest embodiment of the invention, the signal fed back to the first stage is the inverse of the signal obtained from the last stage. In a slightly more complex embodiment (but one requiring fewer cores) the effect of the inverse of the signal from the last stage is generated by combining this signal with the signals from certain other stages in an "inhibit" type of circuit. In still more complex embodiments of the invention (requiring still fewer cores) the signal is combined with signals from other stages in a manner to be described. Still further improvements can be made by causing the binary signals shifted into two or more stages (not just the first) to be obtained from combinations of signals obtained from two or more other stages.

The various objects recited above, as well as other objects of the invention, are fully disclosed in the following description and claims which disclose, by way of examples, the preferred embodiments of the invention and the best modes which have been contemplated for carrying out these embodiments.

Figure 1:
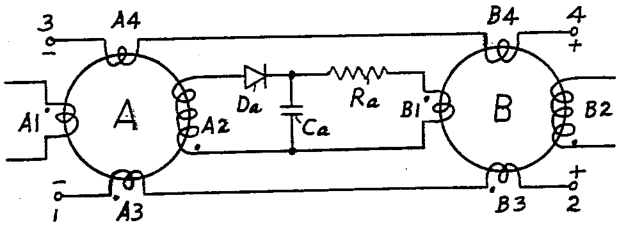
FIG. 1 shows an elemental magnetic core shift register circuit, which is known to the prior art, and which is used as an element in the embodiments of the invention.

The type of elemental magnetic core shifting circuit used in the counters to be described is shown in FIG. 1. This shifting circuit is known to the prior art. Two magnetic cores A and B, each have four windings, numbered 1 through 4. The number 3 windings are connected in series betwen terminals 1 and 2, and the number 4 windings are connected in series between terminals 3 and 4. Windings A2 and B1 are connected together at one end of each, and are connected together at their other ends through a rectifier D*a* and resistor R*a*. A capacitor C*a* is connected between the first-mentioned ends of windings A2 and B1 and the junction of rectifier D*a* and resistor R*a*. The magnetic cores, A and B, are made of material which has an approximately rectangular hysteresis loop. Remanent magnetization in one direction represents a 1, and remanent magnetization in the opposite direction represents a 0. The actual direction of magnetization is of no consequence; it is only the direction relative to the polarity of connections to the windings that is of consequence. A conventional dot notation is used to indicate winding polarity. A dot is placed near one terminal of each winding. If current enters a winding from a relatively positive polarity source at a dot terminal, the resulting magnetomotive force generated in the core tends to set the core to 1. When the flux in the core changes from the direction representing 0 to the direction representing 1 a voltage is induced in each winding, the polarity of the induced voltage being relatively positive at the dot terminal. Opposite effects occur for current in the opposite direction in a winding and for flux change in the opposite direction.

The purpose of the shifting circuit of FIG. 1 is to shift the binary digit (0 or 1) in core A to core B. The shifting is accomplished by applying a pulse of current across terminals 1 and 2 with the relatively positive potential at 2. The current which flows through the series connection of the A3 and B3 windings (called the drive windings) causes the cores to be set to 0. If A contained a 1, a voltage will be induced in the A2 winding with the relatively positive polarity at the no-dot terminal of this winding, which is connected to diode D*a*. This diode will conduct and allow capacitor C*a* to become charged with the positive potential at the terminal connected to the junction of D*a* and resistor R*a*.

If A initially contained a 0, substantially no induced voltage will occur at A2 so that *Ca* will not become charged. The driving current in A3 and B3 is maintained only sufficiently long to set the cores to 0, and then this current is terminated. The charge, if any, in *Ca* then flows through R*a* and B1. It cannot return through D*a* because D*a* presents a high resistance to flow of current in the reverse direction. The flow of current from *Ca* causes B to be set to 1 if A initially was at 1, but if A was initially at 0, the negligible charge from *Ca* will not set B to 1, and it will therefore be left at 0.

At the time a digit was being shifted from A to B another digit could have shifted into A from another source by a similar shifting circuit connected to winding A1. Similarly, the digit initially contained in B could have been shifted to a third core at the same time by means of a similar shifting circuit connected to winding B2.

A reset circuit consisting of windings A4 and B4 connected in series between terminals 3 and 4, is shown in FIG. 1. A temporary pulse of current applied across these terminals can be used to cause the initial setting of the cores to be any set of binary digits desired. No dots are placed near these windings because the windings may be connected with either polarity as desired. For example, to cause A to be reset to 1 initially, the polarity of connection at A4 would correspond to placing the dot at the right-hand terminal of this winding if, as indicated, terminal 4 is connected to the relatively positive potential. In certain instances, the reset current may cause a core to change from 1 to 0. In such instances, a charge will be established in the capacitor in the shifting circuit in the same manner as before. For this reason it is necessary that the reset current be maintained for a long enough time to allow any capacitors that may have become charged, to discharge.

In most of the subsequent drawings the drive windings and the reset windings have been omitted in the interest of clarity in explaining the novel features of this invention, but in all cases it should be understood that they are present and operate in the manner described for FIG. 1.

Figure 2:
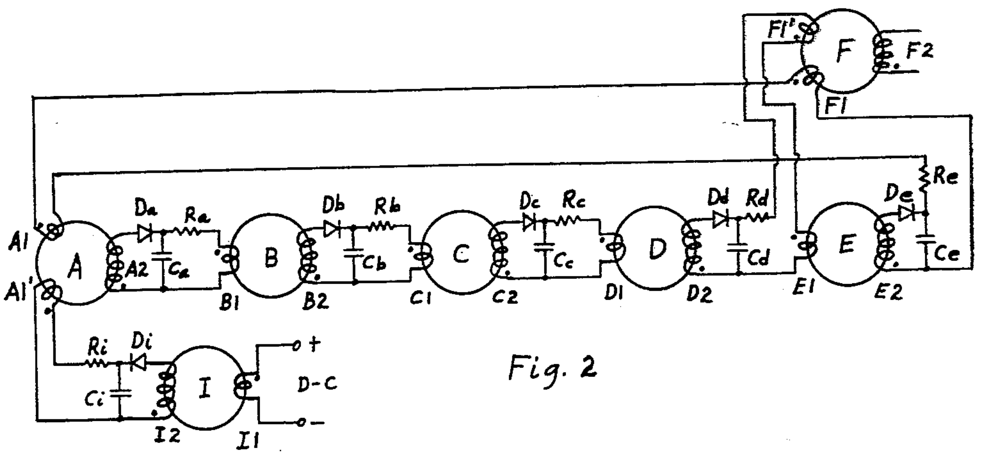
FIG. 2 shows an embodiment of the invention wherein the inverse of the signal from the last stage is entered in the first stage.

The counter circuit in FIG. 2 includes five cores, A, B, C, D, and E in a shifting circuit, and it includes an inverting core I and an output core F. The shifting circuits between A and B, B and C, C and D, and D and E are the same as in FIG. 1. The coupling circuit from E back to A is similar to that shown in FIG. 1, except that because of an inversion of connections and because of the action of the inverting core I, the inverse of the signal obtained from E is entered into A.

A small D.-C. current is maintained in winding I1 of core I. This current is of sufficient magnitude to cause I to be set to 1 in the absence of currents in other windings on the core but is small relative to the current amplitude used in the drive windings, which is several times the minimum necessary to reverse the flux in the cores. Since the shifting circuit from I to A is the same as in FIG. 1, a binary 1 is shifted from I to A each time a pulse of driving current is applied. (The driving current is applied to I as well as to the other five cores.) However, if core E contains a 1 at the time a driving pulse is applied, *Ce* will become charged and will subsequently discharge through winding A1 on core A. The current from *Ce* will enter A1 at the no-dot terminal and will therefore be of a direction which will tend to hold A at 0. The various circuit parameters are so chosen that the magnetomotive force from current in A1 is at least as great as the magnetomotive force from current in A1′, which is supplied from core I. Therefore, the result is that a 1 is entered in A on each step after a 0 was contained in E, but A is set to 0 on each step after a 1 was contained in E. If the five cores are initially set to 00000, they will step through the following pattern of binary digits as successive pulses of driving current are applied.

| | ABCDE |
|---|---|
| 0 | 00000 |
| 1 | 10000 |
| 2 | 11000 |
| 3 | 11100 |
| 4 | 11110 |
| 5 | 11111 |
| 6 | 01111 |
| 7 | 00111 |
| 8 | 00011 |
| 9 | 00001 |
| 10 | 00000 |

Decimal counting action is obtained from the fact that after the 9th step, the pattern of binary digits returns to its initial pattern of 00000.

The decimal output signal can be taken from the counter in FIG. 2 by any of several means, according to the application desired. The particular output circuit shown in FIG. 2 generates a pulse each time the counter steps from decimal 9 to 0. The decimal digit 9 is detected by the fact that D is 0 and E is 1 on 9 and on no other step. Core F acts as an output core. It is set to 1 by passing current from *Ce* in its F1 winding in a direction which tends to set it to 1 and by passing current from *Cd* in its F1′ winding in a direction which tends to set it to 0. The action is that the signal from D inhibits the signal from E. F therefore becomes set to 1 when E is 1 and D is 0. A subsequent driving pulse on F can then be used to generate an output pulse at winding F2.

In applications where the driving current is obtained from the same source or at the same time for the F core as for the other cores in the counter, it may be preferable to set the F core to 1 from step 8 instead of step 9. This is so because the output signal from the F core is obtained one step after this core has been set to 1. F can be set to 1 at step 8 by obtaining the 1 signal from the D core and the inhibiting signal from the C core, since step 8 is the only step on which D is 1 and C is 0.

The counter in FIG. 2 has a feature not found in the other embodiments of the invention to be described, in that for decimal digit 0 all cores (except the I core which is set to 1 by the D.-C. current) are at binary 0. Therefore, the driving line may also be used as the reset line. To reset the counter to decimal 0 the driving current is maintained for a length of time sufficient to allow any capacitors that may have become charged to discharge. Alternatively, the driving circuit may be supplied with a current that is much smaller in amplitude than is normally used for shifting but large enough to reset the cores to 0. In this way the cores will be reset to 0, but the voltages appearing across the capacitors will not become great enough to cause subsequent cores to be set to 1.

By initially setting the five cores to certain combinations of binary digits other than 00000, it is possible to eliminate the I core. One such combination of digits is 10011. The sequence of digits in the five cores is then as follows:

| | ABCDE |
|---|---|
| 0 | 10011 |
| 1 | 01001 |
| 2 | 00100 |
| 3 | 10010 |
| 4 | 11001 |
| 5 | 01100 |
| 6 | 10110 |
| 7 | 11011 |
| 8 | 01101 |
| 9 | 00110 |
| 10 | 10011 |

On each step each binary digit is shifted to the right one position and the inverse of the digit in E is shifted into A as before. For each decimal digit at least one of the five cores contains a binary 1. These 1's can be used to generate the input signal to the A core that would otherwise be generated by the I core. More specifically, on each decimal digit except 1, either A or C is 1 so that by returning the A and C signals to the A core, this core will be set to 1 on each step except after steps when the E core contains a 1. Although neither A nor C is 1 on step 1, it happens that A is to be zero on the following step, so no malfunctioning results.

Figure 3:
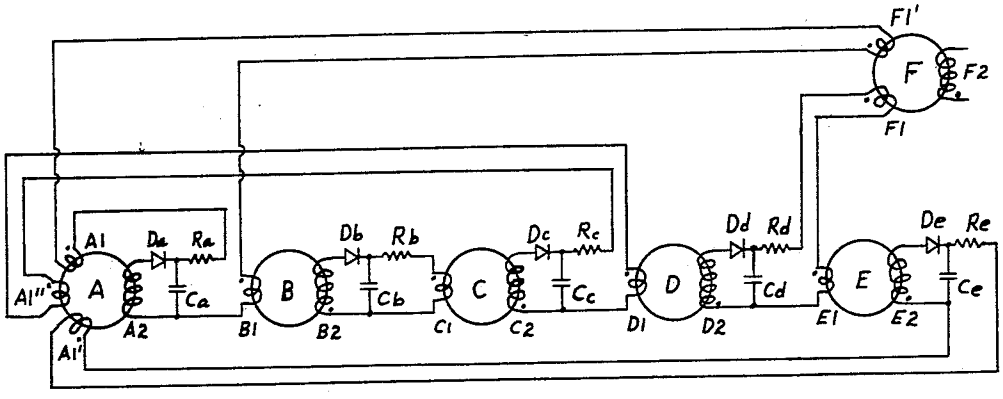
FIG. 3 shows an embodiment wherein the inverse signal is obtained by combining the signal from the last stage with signals from other stages.

A counter circuit which functions as outlined in the previous paragraph is shown in FIG. 3. The discharge path for *Ca* includes winding A1 with the current passing in the direction which tends to set A to 1. The discharge path for *Cc* passes through an added winding A1'', also with the current passing in the direction which tends to set A to 1. The current from *Ce* passes through A1' and prevents the setting of A to 1 on each step after E is 1. On step 6 both A and C are equal to 1 so that the A core receives twice as much magnetomotive force as necessary to set it to 1. If E were 1 on this step, the current from *Ce* might be insufficient to inhibit the action, but E is 0 on this step so no malfunctioning of the counter is incurred.

A variation of the circuit would be to obtain the signals for setting A to 1 from the C and D cores instead of the A and C cores. Although C and D are both 0 on steps 1 and 4, it happens that A is to be zero on the following steps (2 and 5), so no malfunctioning will result.

Step 9 can be distinguished by the fact that A is 0 and D is 1, since this combination does not occur on any other step. The signal for setting the F core to 1 is obtained from *Cd*, and the inhibiting signal from *Ca*. The action of the F core is otherwise the same as before. If it is desired to set the F core to 1 from step 8, this result will be obtained by resetting the cores to 01001 instead of 10011.

Still another pattern for the binary digits in the five cores is as follows:

| | ABCDE |
|---|---|
| 0 | 01011 |
| 1 | 00101 |
| 2 | 00010 |
| 3 | 10001 |
| 4 | 01000 |
| 5 | 10100 |
| 6 | 11010 |
| 7 | 11101 |
| 8 | 01110 |
| 9 | 10111 |
| 10 | 01000 |

Analogous counter circuits can be designed to use this pattern.

Boolean notation will be used in the explanation of the remaining embodiments of counters in accordance with the invention. In this notation, a "sum" such as A+B means A "or" B. A product such as AB means A "and" B. A bar over a symbol such as $\bar{A}$ means "not" A. For a more complete description of Boolean notation, reference is made to Chapters 2 and 3 of "Arithmetic Operations in Digital Computers," by R. K. Richards, published by the D. Van Nostrand Co. in 1955.

If only four stages are used in the ring and if the binary signal entered into the first stage is derived from the signals from the other stages according to the Boolean expression $A\bar{D}+\bar{A}\bar{B}D$, the four stages will step through the following combinations of binary digits. The stages are initially set to 1100.

| | ABCD | |
|---|---|---|
| 0 | 1100 | $A\bar{D}$ |
| 1 | 1110 | $A\bar{D}$ |
| 2 | 1111 | |
| 3 | 0111 | |
| 4 | 0011 | $\bar{A}\bar{B}D$ |
| 5 | 1001 | |
| 6 | 0100 | |
| 7 | 0010 | |
| 8 | 0001 | $\bar{A}\bar{B}D$ |
| 9 | 1000 | $A\bar{D}$ |
| 10 | 1100 | |

As noted in the listing, A and B are 0 and D is 1 on decimal steps 4 and 8. A is 1 and D is 0 on decimal steps 0, 1, and 9. Therefore, on each step following these steps, that is on steps 1, 2, 5, 9, and 0, a 1 is entered into the A stage. For the B, C, and D stages the binary digits are shifted to the right one place on each step.

With some types of shifting circuits it is not difficult to perform a function such as $A\bar{D}+\bar{A}\bar{B}D$, but with the shifting circuit of FIG. 1 which has been selected for illustration of this invention, it is not convenient to perform such a function on one step of shifting. However, it is possible to design an economical counter with this shifting circuit and with the pattern of digits indicated by using the technique illustrated in FIG. 4. In this circuit, the A stage has been divided into two stages, X and Y. Y is set to 1 by the function $A\bar{D}$, that is after steps when A is 1 and D is 0. X is set to 1 by the function $\bar{A}\bar{B}D$, that is after steps when A is 0, B is 0, and D is 1. The B stage is set to 1 after each step that the X or Y stage is on 1. The pattern of digits is then modified to the following. The stages are set to 01100 for a representation of decimal 0.

| | XYBCD | |
|---|---|---|
| 0 | 01100 | $(X+Y)\bar{D}$ |
| 1 | 01110 | $(X+Y)\bar{D}$ |
| 2 | 01111 | |
| 3 | 00111 | |
| 4 | 00011 | $\bar{Y}\bar{B}D$ |
| 5 | 10001 | |
| 6 | 00100 | |
| 7 | 00010 | |
| 8 | 00001 | $\bar{Y}\bar{B}D$ |
| 9 | 10000 | $(X+Y)\bar{D}$ |
| 10 | 01100 | |

X is set to 1 on each step after Y is 0, B is 0, and D is 1. Although Y "or" X is equivalent to A in the previous listing it happens that it is not necessary to consider X in generating the signal for setting X to 1. This is so because X is 0 on each step that the condition $\bar{Y}\bar{B}D$ is satisfied. X is therefore set to 1 on decimal steps 5 and 9, that is after steps 4 and 8. Y is set to 1 on each step after X or Y is equal to 1 when D is equal to 0. As indicated in the listing, Y is set to 1 on steps 0, 1, and 2, that is, after 9, 0, and 1. B is 1 on each step after X or Y is 1.

Figure 4:
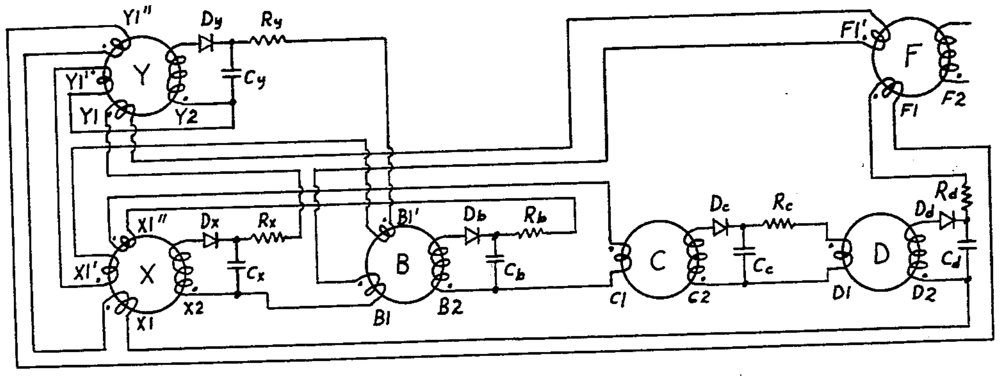
FIG. 4 shows an embodiment wherein the signal entered into the first stage is a more complex function of the signals from other stages.

In the circuit of FIG. 4, core X is set to 1 by current from *Cd*, which is passed through winding X1, but the setting is inhibited by current from either *Cy* or *Cb*, which are passed through windings X1' and X1'', respectively. Similarly, Y is set to 1 by current from *Cx* or *Cy* in windings Y1 and Y1', respectively, but the setting is inhibited by current from *Cd* in winding Y1''. Core B is set to 1 by current from *Cx* or *Cy* in windings B1 and B1', respectively.

Decimal step 9 can be distinguished by the fact that X is 1 and D is 0. Core F is set to 1 by current from *Cx* and *Cd* in a manner similar to that for the previous counters.

Figure 5:
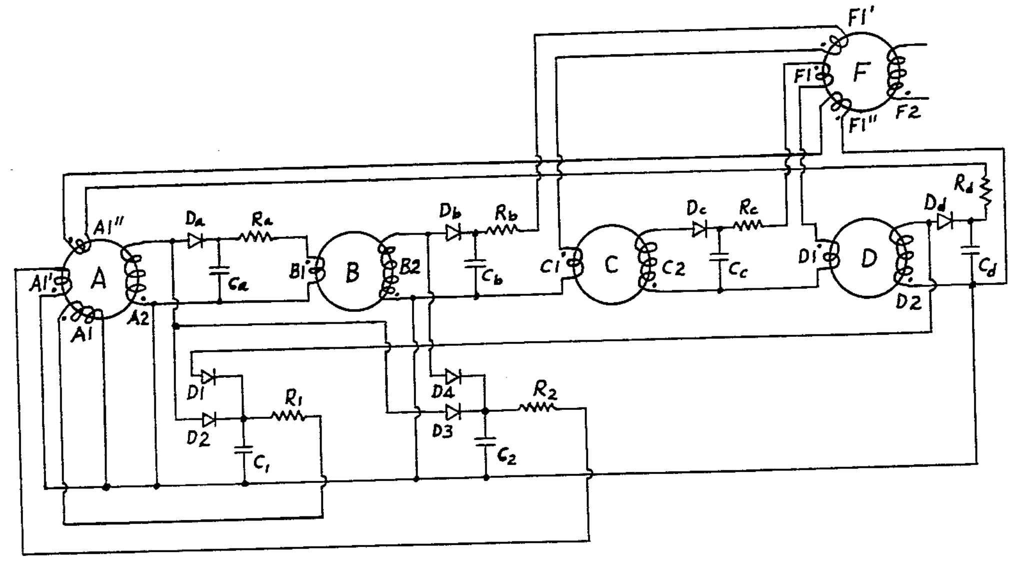
FIG. 5 shows a variation of the embodiment of FIG. 4.

The counter circuit in FIG. 5 follows the pattern of binary digits that has already been presented for a four-stage counter. The means of generating the function $A\bar{D}+\bar{A}\bar{B}D$ are different. Specifically, one less core is required. By conventional Boolean manipulations it may may be shown that $(A+D)(\bar{A}+\bar{B}+\bar{D})$ is equal to $A\bar{D}+\bar{A}\bar{B}D$. From this new form of the expression it may be seen that core A can be set to 1 under proper conditions if a magnetomotive force twice that which is normally necessary is applied to A when A or D is equal to 1 and if an inhibiting magnetomotive force of conventional amplitude is applied when A or B is 1 and another inhibiting force of conventional magnitude is applied when D is equal to 1. To illustrate the several possible conditions in more detail, it may be observed that the three signals, A, B, and D can exist in any one of eight possible combinations as follows:

| A B D | A+D | A+B | D | Net |
|---|---|---|---|---|
| 0 0 0 | | | | |
| 0 0 1 | +2 | | −1 | +1 |
| 0 1 0 | | −1 | | −1 |
| 0 1 1 | +2 | −1 | −1 | |
| 1 0 0 | +2 | −1 | | +1 |
| 1 0 1 | +2 | −1 | −1 | |
| 1 1 0 | +2 | −1 | | +1 |
| 1 1 1 | +2 | −1 | −1 | |

The columns $A+D$, $A+B$, and D indicate the units of magnetomotive force generated by the respective signals. The column designated "net" indicates the sum of the magnetomotive forces. When the net is +1, core A is set to 1. Note that this occurs when A is 0, B is 0, and D is 1 or when A is 1 and D is 0 as specified previously.

The counter circuit of FIG. 5 functions in the following manner. Diodes $D_1$ and $D_2$ function as a conventional "or" circuit in that current through them causes capacitor $C_1$ to become charged whenever the driving current sets core A or core D to 0 from a 1. The discharge path for $C_1$ is through winding A1. The number of turns on A1 should be appropriately large or the resistance value of R1 should be appropriately small to insure that approximately twice the normal magnetomotive force is generated in A. Similarly, diodes $D_3$ and $D_4$ form an "or" circuit for the charging of $C_2$ from the A or B cores. The discharge path for $C_2$ is through the A1′ winding and the current is in the direction which tends to inhibit the setting of A to 1. The current from C*d* is passed through the A1″ winding and is also in the direction which tends to inhibit the setting of A to 1. However, because of the double magnetomotive force from A1, the inhibiting action is effective only when $A+B$ is 1 at the same time that D is 1.

If the counter is reset to 0001 as indicated previously. decimal 9 will be 0010. Decimal 9 can be distinguished by the fact that B is 0, C is 1, and D is 0 because this combination of binary digits does not occur on any other decimal digit. The output core F is caused to be set to 1 by current from C*c* with inhibiting signals from C*b* and C*d*. These currents are passed through windings F1, F1′, and F1″, respectively. In this way F will be set to 1 on steps after which C is 1 and B and D are both 0.

In the circuit of FIG. 5 the sequence of entry of binary digits into A was 1111001000. Other sequences which can be used for such decimal counters are as follows:

1111010000
1111011000
1111010010
1100110101

The inverse (interchange 1's and 0's) or the reverse (take the digits in the opposite) order of any of these sequences can also be used. For example, for the sequence 1111010010 the function for determining the binary digit to be entered into the A state in a four stage counter is $\bar{A}C+C\bar{D}+AB\bar{C}$.

Figure 6:
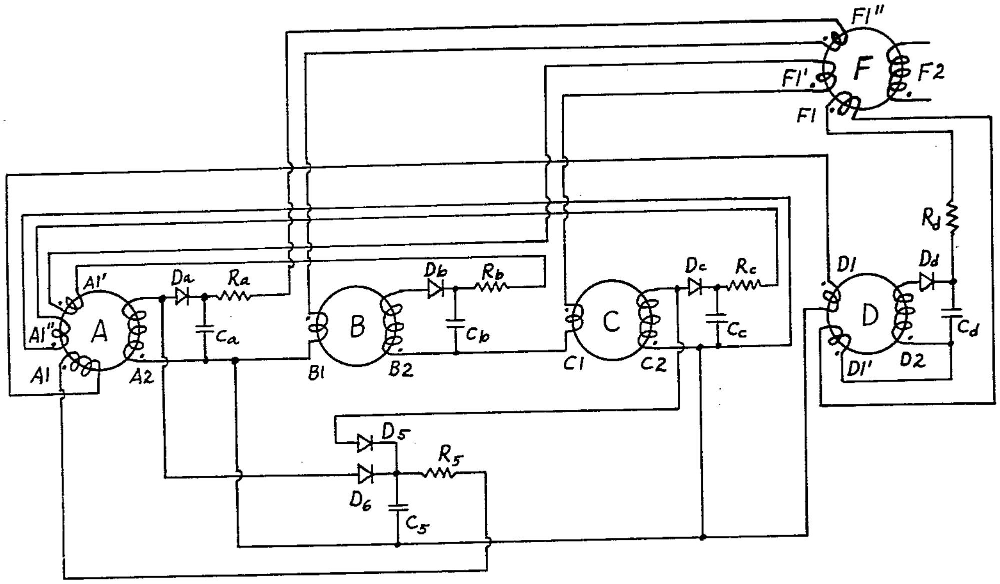
FIG. 6 shows an embodiment of the invention wherein the four stages of the ring function as an interconnected ring of three and a ring of one.

The number of diodes required can be reduced still further by using the counter circuit of FIG. 6. This counter is a ring of three stages A, B, and C, and a ring of one stage D. The pattern of binary digits for the ten decimal digits is as follows:

| | ABCD |
|---|---|
| 0 | 1000 |
| 1 | 1101 |
| 2 | 1110 |
| 3 | 0111 |
| 4 | 0010 |
| 5 | 1001 |
| 6 | 1100 |
| 7 | 1111 |
| 8 | 0110 |
| 9 | 0011 |
| 10 | 1000 |

For the three stages A, B, and C the digit entered into the A stage is 1 on each step after a step where B is 0 or C is 0. Such steps occur at decimals 0, 1, 4, 5, 6, and 9. Therefore, a 1 is entered into A on steps 1, 2, 5, 6, 7, and 0. D is set to 1 on each step after D was 0.

The generation of the 1 to be entered into A can be accomplished as follows. Observe that A "or" C is 1 on each of the ten steps. Therefore the function for generating A can be $(A+C)(\bar{B}+\bar{C})$. This function can be obtained by forming an $A+C$ signal which produces a double magnetomotive force in the A core with this force being inhibiting only when both B and C are 1. In FIG. 6 the function is accomplished by diodes $D_5$ and $D_6$ which form an "or" circuit for charging $C_5$ when cores A or C are changed from the 1 state to the 0 state by the driving current. $C_5$ discharges through the path that contains R5 and A1 winding on A, where the A1 winding in this circuit contains twice the conventional number of turns. Capacitors C*b* and C*c* discharge through A1′ and A1″ windings respectively. Because of the double magnetomotive force from the A1 winding, the inhibiting action is effective only when both B and C are 1. The discharge path for $C_5$ also includes the D1 winding, which has a conventional number of turns. Since A "or" C is equal to 1 on every step, there will be a tendency to insert a 1 in D on every step. However, C*d* discharges through the D1′ winding with the current in the direction that inhibits the setting of D. The result is that D becomes set to 1 on alternate steps.

Since the three stages, A, B, and C cycle through five distinct combinations of 1's and 0's (decimal 5 through 9 is a repetition of the pattern obtained on decimal 0 through 4) and since the D stage changes phase with respect to the first three stages on alternate cycles, ten distinct combinations of binary digits occur, and the circuit therefore acts as a decimal counter.

Decimal 9 can be identified by the fact that A is 0, B is 0, and D is 1. The signal for setting the output core F is therefore obtained from C*d* with inhibiting windings from C*a* and C*b*. In principle, the action is the same as before except that D must be 1 when both A and B are 0 for F to be set to 1.

In the circuit of FIG. 6, it may be observed that current is supplied to the A1 winding of A and and the D1 winding of D on every step. For this reason components $D_5$, $D_6$, $C_5$ and $R_5$ may be replaced by a current source of proper amplitude and timing which is external to the counter. Such a substitution may be desirable in applications where a large number of counters are to be operated simultaneously. The common source may then be more economical than a separate source for each counter circuit. A similar feature could be adopted to replace the I core and its associated shifting circuit in the counter of FIG. 2.

Figure 7:
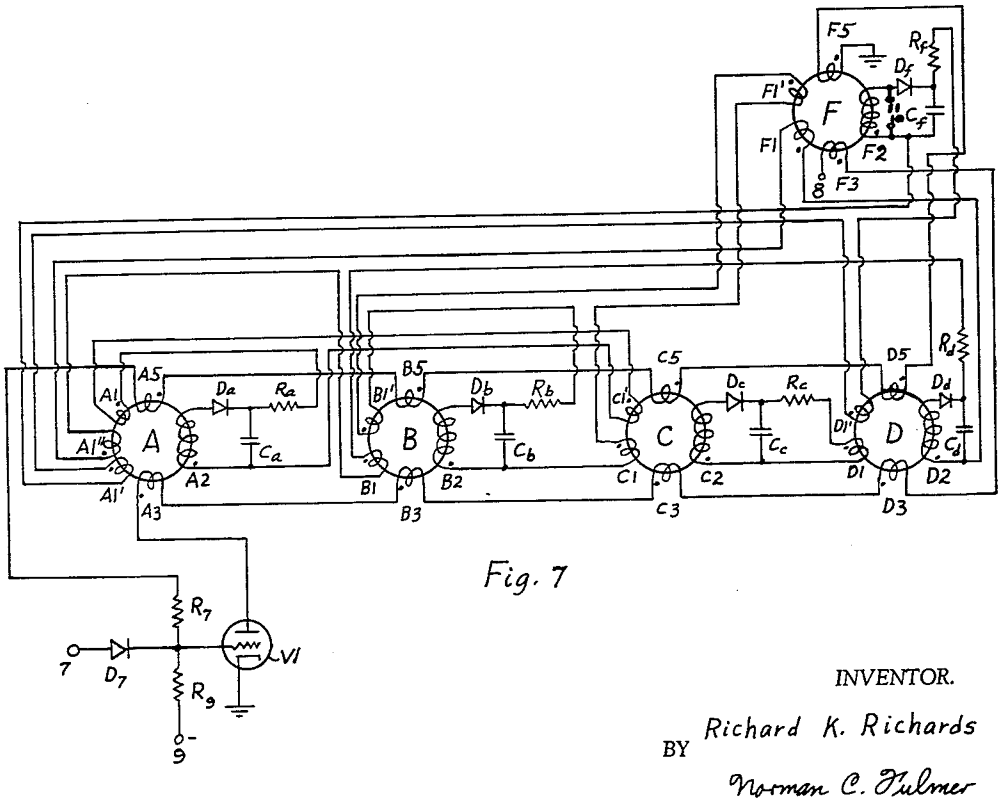
FIG. 7 shows an embodiment wherein the signal entered at certain stages other than the first is obtained by logical combinations of the signals from other stages, and also shows a preferred type of driving circuit.

The counter circuit in FIG. 7 integrates the output core F with the stages in the counter, and the need for special "or" circuits or double magnetomotive forces is eliminated. Although binary digits are shifted among stages in the counter, the pattern of shifting is more complex than in the elementary ring circuits.

Specifically, the pattern is as follows:

| | ABCDF |
|---|---|
| 0 | 10000 |
| 1 | 10100 |
| 2 | 10110 |
| 3 | 01110 |
| 4 | 00110 |
| 5 | 01010 |
| 6 | 00100 |
| 7 | 00010 |
| 8 | 01000 |
| 9 | 00101 |
| 10 | 10000 |

The logical functions which cause the cores to step through this pattern of 1's and 0's are as follows:

$$A_{+}=(A+F)\overline{D}$$
$$B_{+}=\overline{B}D$$
$$C_{+}=A+B$$
$$D_{+}=C\overline{F}$$
$$F_{+}+B\overline{D}$$

The plus subscript, such as in $A_{+}$, indicates the value of A on the step after any selected step. For example, A is 1 on each step after A is 1 or F is 1 and at the same time that D is 0. Being more specific, on the decimal 0 step, for example, A is 1 and F is 0. Therefore A should be 1 on decimal 1. The same condition prevails on decimal 1 so that A should be 1 on decimal 2. On decimal 2, A is 1 but D is 1 also; therefore A should be 0 on the step corresponding to decimal 3. The determination for the value of A is made in a similar manner for the remaining decimal digits. Similarly, the values of B, C, D, and F are determined on each step according to the Boolean function indicated for the respective stages.

In the counter in FIG. 7, the connections are made to follow the indicated logical functions, with the type of circuits being conventional. For example, the discharge path for *Ca* includes winding A1 on core A with the direction of current tending to set A to 1. The discharge path for *Cf* includes winding A1' with the direction of flow also tending to set A to 1. Since A and E are never both 1 on the same step, it will never happen that a double magnetomotive force is generated in A. The discharge path for *Cd* is through winding A1'' on A with the direction of current flow tending to hold A at 0. The result is that a 1 from D inhibits the entry of a 1 into A. By means of connections of the same type, current, if any, from *Cd* tends to set B to 1 but the action is inhibited by current, if any, from *Cb*. Current from either *Ca* or *Cb* will set C to 1. Current from *Cc* will set D to 1 except on steps where current from *Ce* causes an inhibiting action. Lastly, core F is set to 1 by current from *Cb* except when an inhibiting action by current from *Cd* is produced.

Vacuum tube V1 is the major component of the driving circuit of the counter in FIG. 7. The anode of the tube is connected through the series connection of the drive windings A3, B3, C3, D3, and F3 of the five cores to a positive potential supply voltage at terminal 8. The tube is normally held cut-off by resistor $R_9$ which is connected between the grid and a negative-polarity supply voltage at terminal 9. The grid is also connected through $R_7$ and through the series connection of a set of windings A5, B5, C5, D5, and F5 on each core to ground. These windings serve as feedback windings.

To actuate the counter, a positive pulse of short duration is applied at terminal 7. The positive pulse causes rectifier $D_7$ to conduct and carry the potential of the grid in the positive direction. When the tube starts to conduct, driving current starts to flow to the cores. Since on each of the ten steps at least one of the cores is at 1, a flux reversal will occur in at least one core. A voltage will be induced in the feedback winding of this core and it will cause a further positive excursion of the grid potential. The driving circuit acts like a conventional blocking oscillator with the cores in the counter acting as the feedback transformer. When the flux in the core or cores has been completely reversed the feedback voltage will terminate, and bias voltage through $R_9$ will again carry the tube to the cut-off condition.

The output pulse from the counter in FIG. 7 can be taken from the F2 winding on F as indicated by the connections to terminals 10 and 11. Whenever the counter is stepped from decimal 9 to decimal 0 a pulse appears at these terminals with the relatively positive potential at terminal 11.

In FIG. 7 the amplitude of the feedback pulse is a function of the number of cores that are changed from 1 to 0 by the driving pulse. By examination of the pattern of binary digits it will be seen that the number of cores so affected may be one, two, or three. Limiter circuits could be installed to cause the amplitude of the feedback pulse to be independent of the number of cores being set to 0, but the clamping action of the grid of tube V1 serves this function automatically without the need for extra equipment.

Other patterns of binary digits may be used in the development of counters of the type shown in FIG. 7. One such other pattern is obtained if the five cores are set to 1 according to the following logical functions:

$$A_{+}=(A+B)\overline{D}$$
$$B_{+}=\overline{B}D$$
$$C_{+}=(A+B)\overline{F}$$
$$D_{+}=C\overline{F}$$
$$F_{+}=B\overline{D}$$

In some of the embodiments which have been described, the total number of windings required can be reduced. For example, in the counter circuit of FIG. 7 it is possible, if desired, to replace A1 and A1' by a single winding with the discharge path for both *Ca* and *Cf* passing through this single winding. As another example, the F1' and F1'' windings in the counter circuit of FIG. 6 can be replaced by a single winding with discharge paths for *Ca* and *Cd* both passing through the same winding on core F. The electrical coupling which is created between shifting circuits by connections of this type may, however, be undesirable in some applications.

Another variation which can be obtained with the counter circuit in FIG. 7 involves the elimination of winding F5 on core F. This winding can be eliminated without any other change than the connection of the dot terminal of winding D5 on core D to ground. The feedback signal to V1 is generated properly without the F5 winding because, as may be observed from the pattern of 1's and 0's for this counter, at least one of the four cores A, B, C, and D contains a 1 for each decimal step so that a feedback pulse is generated on each step without the feedback signal from core F.

Although core F is an integral part of the counter circuit in FIG. 7 (this core is needed to distinguish decimal 6 from decimal 9), core F serves only an output function in the counter circuits of FIGS. 2, 3, 4, 5, and 6. Many other types of output circuits are possible. For example, in the counter circuit of FIG. 2 core F may be eliminated. Instead, windings which may be designated as D6 and E6 may be placed on cores D and E, respectively. The output signal is generated through a series connection of these windings with the connections to the individual windings of such polarity that a positive potential is generated at one terminal of the series connection during each step that a voltage is induced in the E6 winding when an opposing voltage is not induced in the D6 winding.

The principles of this invention can be applied by those skilled in the art to other types of shifting circuits. These other shifting circuits may use cores, tubes, transistors, or other devices as the major components.

It has been shown by way of examples how the number of stages in a decimal counter employing shifting circuits can be reduced below the ten required for counters of conventional design. It is to be understood that the above-described arrangements are illustrative of the application of the principles of this invention. Numerous other arrangements and combinations of the arrangements shown may be devised by those skilled in the art without departing from the spirit and scope of the invention as defined in the claims.

What is claimed is:

1. A decimal counter circuit comprising a shift register of four stages, the first of said stages having a first bistable device X and a second bistable device Y with each bistable device having input means and output means, and the second, third, and fourth of said stages each having one bistable device B, C, and D, respectively, each bistable device having input means and output means, means coupling the output means of X and Y to the input means of B with said coupling combining the signals from the two said output means in an "or" relationship, means coupling the output means of B to the input means of C, means coupling the output means of C to the input means of D, means coupling the output means of Y, B, and D to the input means of X with said coupling causing the signal from the output means of D to be inhibited by the occurrence of a signal from either of the other two said output means, and means coupling the output means of X, Y, and D to the input means of Y with said coupling causing the signals from the output means of X and Y to be combined in an "or" relationship with said resultant signal being inhibited by the occurrence of a signal from the output means of D.

2. A decimal counter circuit comprising a shift register of four stages, each of the four stages having a bistable device A, B, C, and D, respectively, each bistable device having input means and output means, means coupling the output means of A, B, and C to the input means of B, C, and D, respectively, means coupling the output means of A and D to the input means of A with said coupling combining the signals from the two output means in an "or" relationship and with said coupling means causing a signal twice normal amplitude to be applied to the input means of A, means coupling the output means of A and B to the input means of A with said coupling combining the signals from the two output means in an "or" relationship and with said coupling means causing a signal or normal amplitude to be applied to the input means of A with the polarity of said signal being such as to inhibit the entry of signals to A, and means coupling the output means of D to the input means of A with said coupling causing a signal of normal amplitude to be applied to the input means of A with the polarity of said signal being such as to inhibit the entry of signals to A.

3. A decimal counter circuit comprising a shift register of four stages, each of the four stages having a bistable device A, B, C, and D, respectively, each bistable device having input means and output means, means coupling the output means of A and B to the input means of B and C, respectively, means coupling the output means of A and C to the input means of A and D with said coupling combining the signals from the two said output means in an "or" relationship and with said coupling causing a signal of twice normal amplitude to be applied to the input means of A and a signal of normal amplitude to be applied to the input means of D, means coupling the output means of B to the input means of A with said coupling causing a signal of normal amplitude to be applied to the input means of A with the polarity of said signal being such as to inhibit the entry of signals to A, means coupling the output means of C to the input means of A with said coupling causing a signal of normal amplitude to be applied to the input means of A with the polarity of said signal being such as to inhibit the entry of signals to A, and means coupling the output means of D to the input means of D with said coupling causing a signal of normal amplitude to be applied to the input means of D and with the polarity of said signal being such as to inhibit the entry of signals to D.

4. A decimal counter circuit comprising a shift register, said shift register having an A stage, a B stage, a C stage, and a D stage, means for entering the signals from the A stage, the B stage, and the C stage into the B stage, the C stage, and the D stage, respectively, means for combining the output signals from the A stage, the B stage, and the D stage to form an input signal which occurs when at least one of two combinations of signals occur where one of said combinations is the presence of a signal from the A stage and the absence of a signal from the D stage, and the other of said combinations is the presence of a signal from the D stage, the absence of a signal from the A stage, and the absence of a signal from the B stage, and means for entering said input signal into the A stage.

5. A decimal counter circuit comprising a shift register, said shift register comprising a first, a second, a third, a fourth, and a fifth stage, means for shifting the signals from said first, second, third, and fourth stages to said second, third, fourth, and fifth stages, respectively, means for combining the presence of a signal from at least one of a selected plurality of said first, second, third, and fourth stages with the absence of a signal from said fifth stage to form an input signal, and means for entering said input signal into said first stage.

6. A decimal counter circuit comprising a shift register, said shift register comprising a first, a second, a third, a fourth, and a fifth stage, means for shifting the signals from said first, second, third, and fourth stages to said second, third, fourth, and fifth stages, respectively, means for combining the presence of a signal from at least one of said first and third stages with the absence of a signal from said fifth stage to form an input signal, and means for entering said input signal into said first stage.

7. A decimal counter circuit comprising a shift register, said shift register comprising a first, a second, a third, a fourth, and fifth stage, means for shifting the signals from said first, second, third, and fourth stages to said second, third, fourth, and fifth stages, respectively, means for combining the presence of a signal from at least one of said third and fourth stages with the absence of a signal from said fifth stage to form an input signal, and means for entering said input signal into said first stage.

8. A decimal counter circuit comprising a shift register, said shift register having an A stage, a B stage, a C stage, and a D stage, means for entering the signals from the A stage, the B stage, and the C stage into the B stage, the C stage, and the D stage, respectively, means for combining the output signals from the A stage, the B stage, and the D stage to form an input signal where said input signal is represented by repetitions of the sequence 1111001000, and means for entering said input signal into the A stage.

9. A counter circuit comprising a magnetic core shift register, said shift register comprising a plurality of magnetic core stages, means for causing the code with which said counter circuit operates to be such that at least one stage is in a given state of equilibrium for each state of equilibrium of the counter circuit as a whole, a drive winding and a feedback winding on each of said magnetic core stages, an amplifier having an input circuit and an output circuit, means connecting all of said drive windings to said output circuit, and means connecting all of said feedback windings to said input circuit.

10. A counter circuit comprising a magnetic core shift register, said shift register comprising a plurality of magnetic core stages, means for causing the code with which said counter circuit operates to be such that at least one stage is in a given state of equilibrium for each state of equilibrium of the counter circuit as a whole, a drive winding on each of said magnetic core stages, a feedback winding on each of selected ones of said magnetic core where said ones are selected with relationship to said code to insure a feedback action for each actuation of said counter circuit, an amplifier having an input circuit and an output circuit, means connecting all of said drive windings to said output circuit, and means connecting all of said feedback windings to said input circuit.

References Cited in the file of this patent

UNITED STATES PATENTS

| | | |
|---|---|---|
| 2,778,006 | Guterman | Jan. 15, 1957 |
| 2,794,130 | Newhouse | May 28, 1957 |
| 2,806,947 | MacKnight | Sept. 17, 1957 |
| 2,825,805 | Ziffer | Mar. 4, 1958 |

(Other references on following page)

UNITED STATES PATENTS

| | | |
|---|---|---|
| 2,853,238 | Johnson | Sept. 23, 1958 |
| 2,896,848 | Miehle | July 28, 1959 |
| 3,014,656 | O'Brien | Dec. 26, 1961 |

FOREIGN PATENTS

| | | |
|---|---|---|
| 769,478 | Great Britain | Mar. 6, 1957 |

OTHER REFERENCES

Guterman et al.: Logical and Control Functions Performed With Magnetic Cores, Proceedings of the IRE, March 1955, pages 291–298.

Digital Computer Elements, by Mack Electronics, page 1 relied on.

Bimag Circuits for Digital Data-Processing Systems, IRE Convention Record, part 4, pages 70–83.

Magnetic Elements in Arithmetic and Control Circuits, Electrical Engineering, vol. 74, No. 9, September 1955, pages 766–770.